United States Patent [19]

Wakabayashi et al.

[11] Patent Number: 4,688,763
[45] Date of Patent: Aug. 25, 1987

[54] FILM FEEDING DEVICE IN A CAMERA

[75] Inventors: Hiroshi Wakabayashi, Yokohama; Fumito Obikawa, Chino; Masayuki Ikeda, Suwa, all of Japan

[73] Assignee: Nippon Kogaku K. K., Tokyo, Japan

[21] Appl. No.: 804,322

[22] Filed: Dec. 4, 1985

Related U.S. Application Data

[63] Continuation-in-part of Ser. No. 769,773, Aug. 27, 1985, abandoned, which is a continuation-in-part of Ser. No. 653,728, Sep. 24, 1984, abandoned.

[30] Foreign Application Priority Data

Oct. 1, 1983 [JP] Japan ................... 58-181,815
Dec. 4, 1984 [JP] Japan ................... 59-256280

[51] Int. Cl.$^4$ ............................................. G03B 1/00
[52] U.S. Cl. ............................. 354/173.11; 354/214
[58] Field of Search ................. 354/173.1, 173.11, 214

[56] References Cited

U.S. PATENT DOCUMENTS

| | | | |
|---|---|---|---|
| 3,511,154 | 5/1970 | Simon | 354/214 |
| 4,373,795 | 2/1983 | Kimura et al. | 354/173.1 |
| 4,465,351 | 8/1984 | Tominaga | 354/214 X |
| 4,482,226 | 11/1984 | Tamamura | 354/214 X |
| 4,506,965 | 3/1985 | Kitajima et al. | 354/214 X |

Primary Examiner—W. B. Perkey
Attorney, Agent, or Firm—Shapiro and Shapiro

[57] ABSTRACT

A film feeding device in a camera comprises drive means having an electric motor, winding-up means driven to wind up an unexposed film, rewinding means driven to rewind an exposed film, change-over means having a winding-up position in which the winding-up means is operatively associated with the drive means and a rewinding position in which the rewinding means is operatively associated with the drive means, the change-over means being for selectively causing the winding-up means and the rewinding means to be engaged with the drive means, means operated to load another new unexposed film into the camera after the film has been rewound by the rewinding means, and control means for moving the change-over means to the rewinding position to drive the rewinding means and moving the change-over means to the winding-up position in response to the operated means.

21 Claims, 17 Drawing Figures

FILM FEEDING DEVICE IN A CAMERA

This application is a continuation-in-part of Ser. No. 769,773, filed Aug. 27, 1985, now abandoned, which was a continuation-in-part of Ser. No. 653,728, filed Sept. 24, 1984, now abandoned.

BACKGROUND OF THE INVENTION

1. Field of the Invention

This invention relates to improvements in a film feeding device in a camera of the type in which feeding of a film is effected by an electric motor.

2. Description of the Prior Art

In recent years, automatization has rapidly advanced in cameras, and it is widely practiced to effect winding-up and rewinding of a film by a single electric motor. In this case, the drive force from the motor is transmitted to a winding-up mechanism such as a sprocket and a spool during winding-up, but must be transmitted to a rewinding mechanism engaged with the spool of a film cartridge during rewinding. Therefore, the drive force transmission route from the motor to the winding-up mechanism and the rewinding mechanism is made common part of the way, but from there it is branched off into two routes and the drive force is transmitted selectively to one of the mechanisms by the use of a planet clutch or the like.

However, in such a film feeding device, after completion of the rewinding of the film, the rewinding mechanism remains connected to the motor through a gear train and a planet gear mechanism, and the gear ratio is selected to a very high value and therefore the motor cannot revolve. Moreover, the rewinding fork at the distal end of the rewinding mechanism will be coupled to the spool of an unexposed film cartridge newly loaded into the camera after an exposed film cartridge has been taken out, and this has led to a disadvantage that the leader portion of the film cannot be drawn out to bring it into engagement with the sprocket and the spool.

SUMMARY OF THE INVENTION

It is an object of the present invention to provide an improved film feeding device in a camera wherein winding-up and rewinding of a film are effected by an electric motor.

The film feeding device of the present invention is provided with a change-over device for cutting off the connection between a motor and a rewinding mechanism by a film interchanging operation necessarily effected between the completion of the rewinding of an exposed film and the loading of an unexposed film and connecting the motor and a winding-up mechanism together, and is designed to liberate the rewinding mechanism from the restraint by the motor.

BRIEF DESCRIPTION OF THE DRAWINGS

FIG. 15 shows a switch for directly detecting disconnection of linkage between a motor and a rewinding system.

DESCRIPTION OF THE PREFERRED EMBODIMENTS

Figure 1:
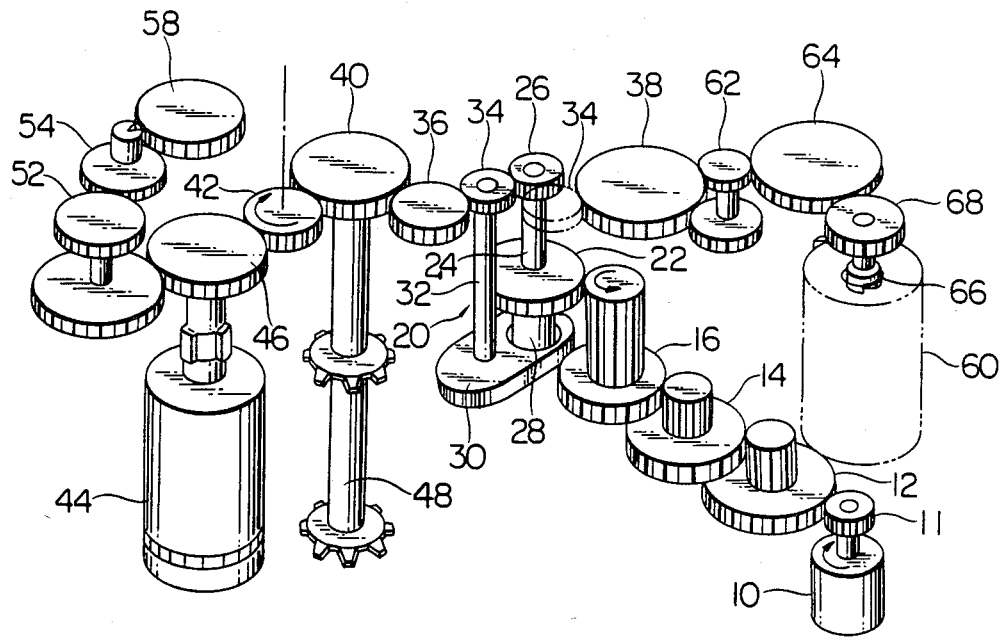
FIG. 1 is a perspective view showing the power transmitting system of a camera according to an embodiment of the present invention.

Referring to FIG. 1 which shows a gear seris, there are disposed an electric motor 10, a rewinding fork 66 coupled to the spool of a film cartridge 60, a sprocket 48 and a wind-up spool 44. Gear trains 12, 14 and 16 each comprising large and small coaxial gears are disposed near the motor 10. An output gear 11 of the motor 10 and a gear 22 of a planetary gear train 20 may be rotated in opposite directions through the intermediary of these gear trains. The gear 22 is made integral with a gear 26 by a rotary shaft 24 and is supported by a shaft 28 loosely fitted in a hole formed at one end of a planet arm 30. A shaft 32 is secured to the free end of the arm 30, and a planet gear 34 is mounted on the upper end thereof. The gear 34 is selectively brought into mesh engagement with one of a gear 36 and a gear 38 by the pivotal movement of the arm 30.

A gear 40 secured to the sprocket shaft 48 is in mesh engagement with the gear 36, and further, a gear 46 on the upper end of the spool 44 is in mesh engagement with the gear 40 through an intermediate gear 42. A set cam 78 which will later be described is coupled to the gear 42. A pair of sprockets are secured to a sprocket shaft 48 to feed a film, and the spool 44 is for taking up the film as is well known. The gear 46 of the spool 44 is in mesh engagement with a gear 58 through gear trains 52 and 54, and the gear 58 is in mesh engagement with a film counter scale plate, not shown.

On the other hand, a gear 68 at the upper end of the rewinding fork 66 is in mesh engagement with the gear 38 through gear trains 62 and 64, and the gears 38 and 68 are rotated in opposite directions.

Figure 2:
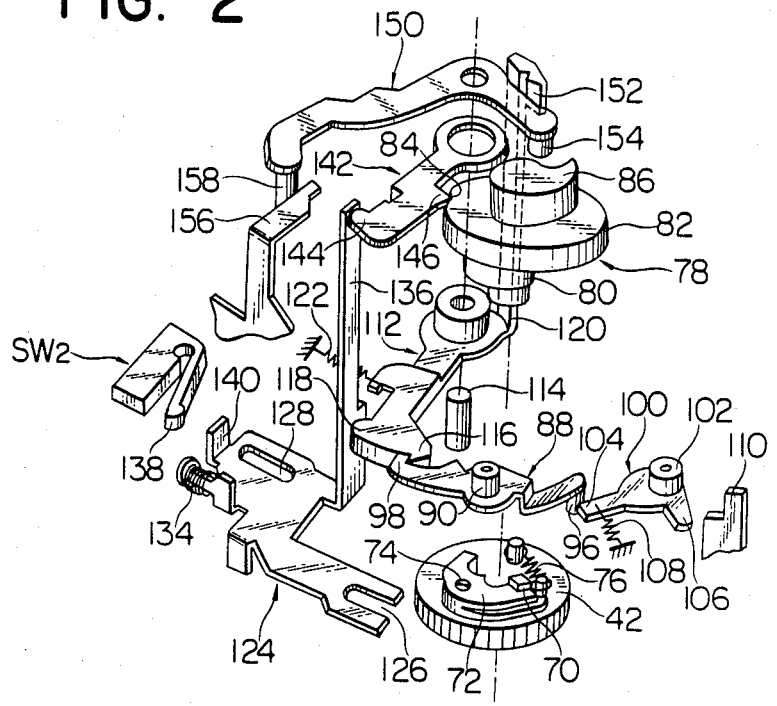
FIG. 2 is an exploded perspective view showing the essential portions of a winding-up mechanism.

The control mechanism of a wind-up system will now be described by reference to FIG. 2. A clutch pawl member 72 provided with a pawl portion 70 is pivotably mounted about a shaft 74 on the upper surface of the gear 42 and is biased in counter-clockwise direction by a spring 76. A set cam 78 is disposed above the gear 42 and an engaging portion 80 projecting from the underside thereof is engageable with the pawl member 72.

The set cam 78 has a recess 84 in the circumferential portion of an intermediate cam 82 and is formed with a cam portion 86 on the upper surface thereof.

Figure 3:
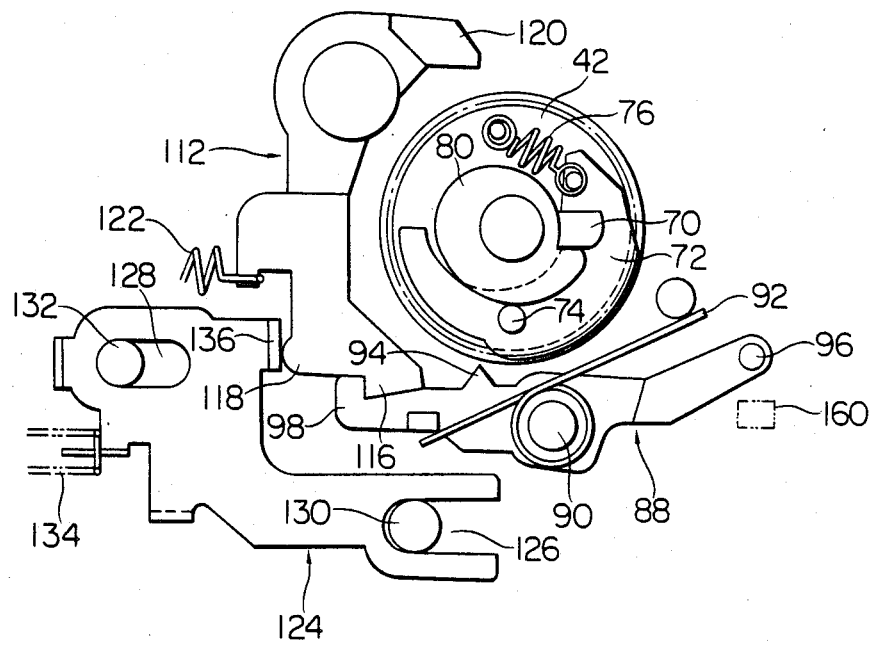
FIGS. 3 and 4 are plan views of the essential portions of the mechanism shown in FIG. 2, during winding-up and rewinding, respectively.

As is apparent from FIG. 3, laterally of the pawl member 72, a lock lever 88 is pivotably mounted about a shaft 90, and the lock lever 88 is biased in clockwise direction by a spring 92 and has a projection 94 capable of contacting the pawl member 72, a pin 96 engageable with a release lever 100 which will later be described, and an engaging portion 98 engageable with a lever 112. In FIG. 2, the release lever 100 is pivotably mounted about a shaft 102, and is provided with a projection 104 capable of contacting the pin 96 and an arm 106 capable of contacting a shutter setting plate 110 and is biased in counter-clockwise direction by a spring 108.

Laterally of the lock lever 88, the aforementioned lever 112 is pivotably mounted about a shaft 114 and coaxially therewith, a lever 142 and a set lever 150 are pivotably provided. The lever 112 is provided with an engaging portion 116 engageable with the engaging portion 98 of lock lever 88, a projection 118 capable of contacting a switch lever 124 which will later be described, and an upright arm 120 capable of contacting the set lever 150 and is biased in clockwise direction by a spring 122. As shown in FIG. 3, the switch lever 124 is slidable while being guided by pins 130 and 132 fitted in grooves 126 and 128, respectively, and is biased rightwardly by a spring 134. The switch lever 124 also has an upright arm 136 capable of contacting the projection 118 and lever 142, and a low upright arm 140 capable of contacting the acting piece 138 of a switch Sw2.

The lever 142 is provided with a projection 144 capable of contacting the upright arm 136 and a projection 146 capable of fitting into the recess 84 of the intermediate cam 82. The set lever 150 is provided with a roller 154 capable of contacting the upper end portion 152 of the upright arm 120 and capable of contacting the set cam 86, and a pin 158 capable of contacting a set plate 156.

The change-over piece of a switch SW1 is operatively associated with a rewind button (R button) 170 for operating a known clutch mechanism provided between the sprocket 48 and the gear 40. The R button 170 is shifted by the depression by an operator for film rewinding and returns to its original position by releasing the back lid 172 of the camera after the completion of rewinding.

Figure 6:
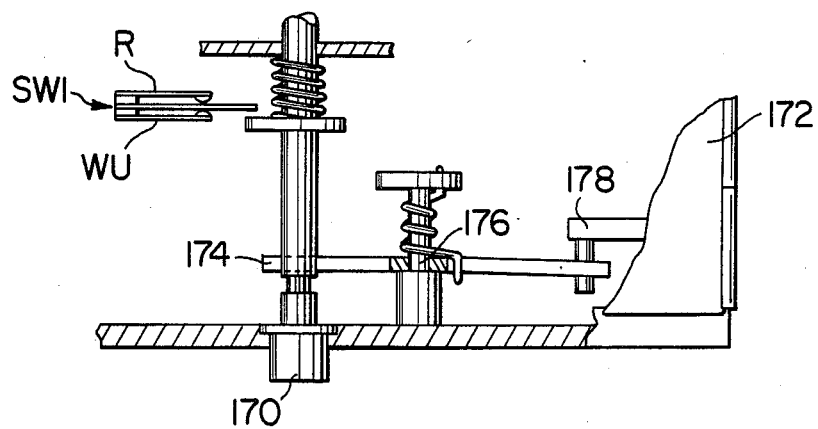
FIG. 6 is a partially sectional view showing a mechanism for change-over of the switch SW1 shown in FIG. 5.

Cooperation among the switch SW1, the R button 170 and the back lid 172 is established by the mechanism shown in FIG. 6. The switch SW1 is connected to the terminal R by the upward movement of the R button 170. A rotation lever 174 supported by a shaft 176 is engaged with a groove of the R button 170. An arm 178 fixed to the back lid 172 shifts the lever 174 upon the opening of the back lid to release the coupling of lever 174 with the groove of the R button, thereby lowering the R button and connecting the switch SW1 with the terminal WU. Consequently, the change-over piece of the switch Sw1 is changed over to the terminal WU side during the wind-up of the film, and to the terminal R side during the rewinding of the film. The change-over piece of the switch Sw2 (FIG. 5) is changed over to the terminal WU side during the winding-up of the film, and to the terminal ST side during the stoppage of the film. A switch Sw3 is operatively associated with the back lid 172, of the camera, and is adapted to be closed upon opening of the back lid and to be opened upon closing of the back lid. Also, a switch Sw4 is changed over to the terminal FD side when the presence of the film is detected, and to the terminal N side at other times. A switch Sw5 repeatedly turns ON and OFF (closes and opens in synchronism with the feeding of the film.

Description will now be made of the operation of the present embodiment during the winding-up phase.

When the shutter is released by a shutter button, not shown, the shutter setting plate 110 is moved leftwardly into contact with the arm 106 and rotates the release lever 100 clockwise against the force of the spring 108. Thereby, the lock lever 88 is rotated counter-clockwise against the force of the spring 92 through the contact between the projection 104 and the pin 96 and the engagement thereof with the lever 112 is released. Thereupon, the lever 112 is rotated clockwise by the action of the spring 122 and the projection 118 thereof causes the switch lever 124 to move leftwardly against the force of the spring 134, and the upright arm 140 presses the acting piece 138, whereby the switch Sw2 is changed over to the terminal WU side (assuming that at this time, the film is loaded and the back lid is closed, the switch Sw3 is open and the switch Sw4 is at the terminal FD side).

As a result, the base of a transistor Q5 is connected to ground through a capacitor C1 and therefore, this transistor Q5 is rendered conductive and transistors Q4 and Q2 are rendered conductive.

Since, during the winding up, the switch Sw1 is connected to the terminal WU side, a current flows through the loop of power source E→transistor Q2→motor 10→switch Sw1→power source E, and the motor starts its forward revolution.

As the motor 10 revolves in the forward direction, the gear 26 rotates clockwise through the intermediary of the gear trains 12, 14 and 16 shown in FIG. 1 and the gear 42 rotates clockwise through the intermediary of the gears 36 and 40. By the clockwise rotation of the gear 42, as shown in FIG. 2, the pawl member 72 comes into engagement with the engaging portion 80 of the set cam 78 to rotate the set cam 78 clockwise and the cam 86 pushes the roller 154 of the set lever 150. Thereby the set lever 150 is rotated counter-clockwise to move the shutter lever 156 in a charge direction (rightward direction), thus becoming ready for the next cycle of photographing.

With the counter-clockwise rotation of the set lever 150, the cam portion 152 of arm 120 is pushed and the lever 112 rotates counter-clockwise, while the lever 142 is rotated clockwise by the intermediate cam 82 and the projection 144 thereof pushes the arm 136 and continues to push the switch lever 124 leftwardly. Accordingly, the switch Sw2 is kept at the terminal WU side and the motor 10 continues to revolve in the forward direction.

During the clockwise rotation of the gear 26, the gears 40 and 46 rotate counter-clockwise and cause the film fed by the sprocket 48 to be taken up by the spool 44. At a point of time when the spool 44 has taken up the film by an amount corresponding to one frame, the lever 142 rotates counter-clockwise and the projection 146 falls into the recess 84 of the intermediate cam 78 which is rotating, the switch lever 124 is moved rightwardly by the action of the spring 134, and the arm 140 becomes disengaged from the acting piece 138. Therefore, the switch Sw2 is changed over to the terminal ST side and the motor 10 is suddenly stopped because the two terminals are short-circuited. When photographing is effected after the film has been wound-up by an amount corresponding to one frame, the operation described above is repeated. During the winding-up of one frame of the film, the switch Sw5 repeatedly turns ON and OFF, and at the moment when the switch Sw5 is opened, a transistor Q7 is rendered conductive and therefore, a capacitor C3 is discharged each time and the CR timer constituted by capacitor C3 and resistor R1 does not act.

Also, when the film becomes exhausted in the course of wind-up, it is no longer fed. The film is stopped with the switch Sw5 remaining closed or open. When the film is stopped with the switch Sw5 remaining closed as well as when the film is stopped with the switch Sw5 remaining open, a capacitor C4 is charged and the base of the transistor Q7 assumes a low potential. Thus the transistor Q7 remains non-conductive and the discharging circuit of the capacitor C3 is cut off. Therefore, the capacitor C3 is charged, and after a predetermined time, a transistor Q6 becomes conductive and the transistors Q4 and Q2 both become non-conductive. In this manner, the power supply circuit of the motor 10 is cut off and thus, the motor 10 is stopped.

Description will now be made of the operation during the rewinding of the film.

The switch Sw1 is changed over to the terminal R side by an extraneous operation effected prior to the rewinding and therefore, both of transistors Q1 and Q3 become conductive. The switch SW2 is switched over to the terminal WU side by unshown mechanism operatively connected to an R-button. As a result, the positive and negative poles of the motor 10 are connected reversely and thus, the motor 10 starts its reverse revolution. As the motor 10 revolves in the reverse direction, the gear 26 is rotated counter-clockwise and the planet arm 30 is rotated counter-clockwise, and the gear 34 becomes disengaged from the gear 36 and comes into mesh engagement with the gear 38 (FIG. 1). When the gear 38 is rotated counterclockwise, the gear 68 of the rewinding fork 66 rotates clockwise through the intermediary of the gear train 62 and 64 and rewinds the film into the film cartridge 60.

Figure 4:
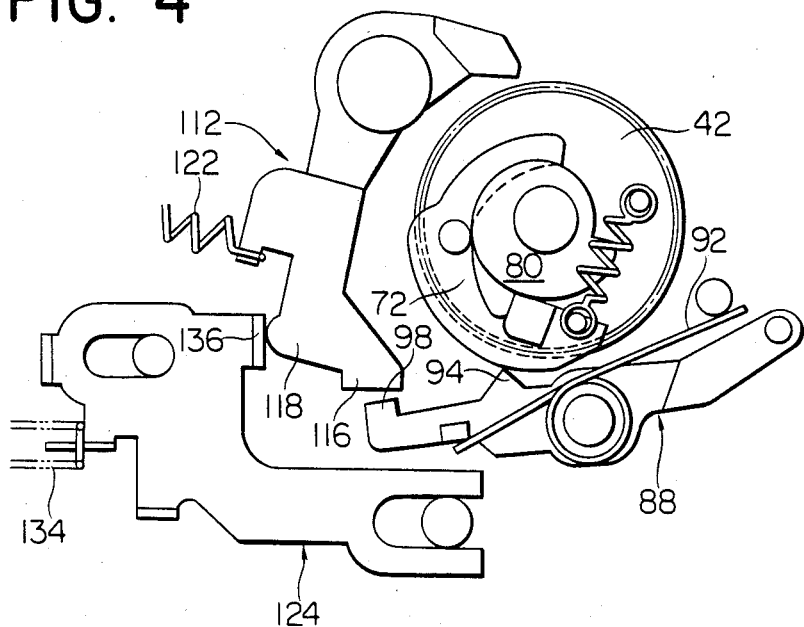

In this state, the gear 40 of the sprocket is no longer connected to the motor 10, but the sprocket is rotated by the rewound film and the gear 40 is rotated clockwise and accordingly, the gear 42 is rotated counter-clockwise. However, as is apparent from FIG. 4, at this time, the pawl member 72 is not engaged with the engaging portion 80 of the intermediate cam 78 and accordingly, the intermediate cam is not driven. Instead, the pawl member 72 is pushed out by the outer peripheral surface of the engaging portion 80 and comes into contact with the projection 94 of the lock lever 88 to rotate the lock lever 88 counter-clockwise against the action of the spring 92. As a result, the engagement between the engaging portion 98 of the lock lever 88 and the engaging portion 116 of the lever 112 is released, so that the lever 112 is rotated clockwise by the action of the spring 122 and the projection 118 thereof pushes the arm 136 of the switch lever 124. Accordingly, the switch lever 124 is moved leftwardly and the switch Sw2 is changed over to the terminal WU side and the same state as that during the winding-up is provided.

When the back lid of the camera is opened after completion of the rewinding, the switch Sw1 is changed over to the terminal WU side and the switch Sw3 is closed. Therefore, the transistor Q5 becomes conductive and the transistors Q4 and Q2 also become conductive and the motor 10 revolves in the forward direction by an amount corresponding to one frame of the film. Accordingly, the gear 26 is rotated clockwise and the planet arm 30 is rotated clockwise, and the gear 34 becomes disengaged from the gear 38 and instead comes into mesh engagement with the gear 36. That is, the rewinding fork 66 becomes free and no longer receives the drive force from the motor 10. Accordingly, even if a new unexposed film cartridge is placed into the film chamber, the leader portion of the film can be drawn out because the fork 66 rotates freely.

The present invention is not restricted to the above-described embodiment, but suitable changes and improvements may be made without departing from the scope thereof. For example, in the above-described embodiment, the design is such that upon opening of the back lid of the camera, the switch Sw1 is changed over to the terminal WU side, whereby the motor 10 revolves in the forward direction. Alternately, to open the back lid, a moving member 160 operatively associated with a back lid opening member operated prior thereto or a member displaced after completion of the rewinding may be provided in proximity to the lock lever 88. Then, and prior to the opening of the back lid or with the completion of the rewinding, the moving member 160 may be moved leftwardly to rotate the lock lever 88 counterclockwise, whereby the switch lever 124 may be moved leftwardly through the intermediary of the lever 112.

Figure 7:
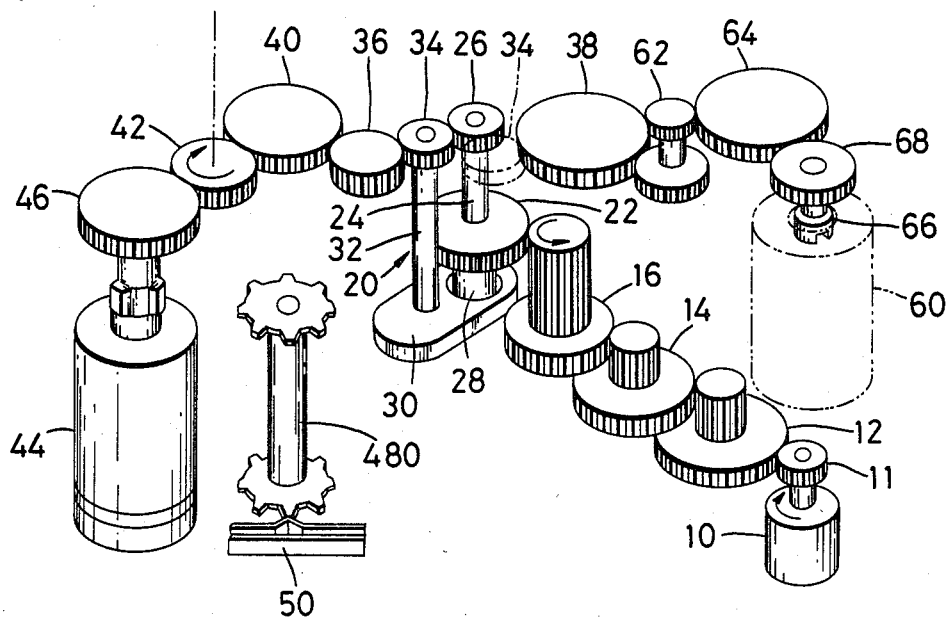
FIG. 7 is a perspective view showing a motive force transmission mechanism in another embodiment of the present invention.
Figure 8:
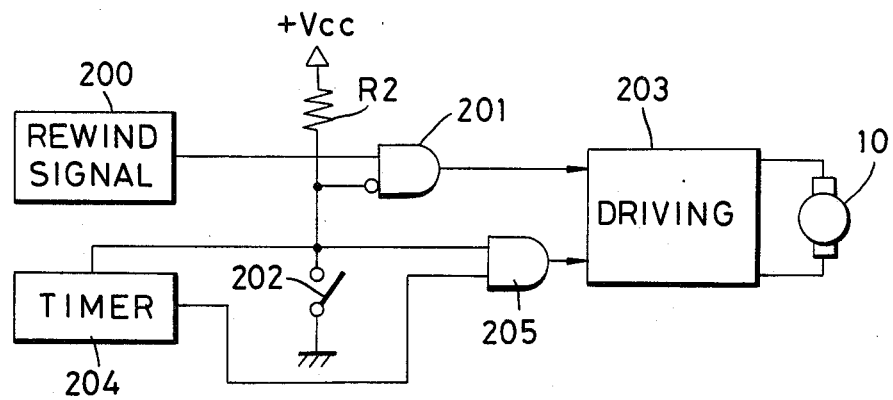
FIG. 8 is a circuit diagram of a motor control circuit in the other embodiment.
Figure 10:
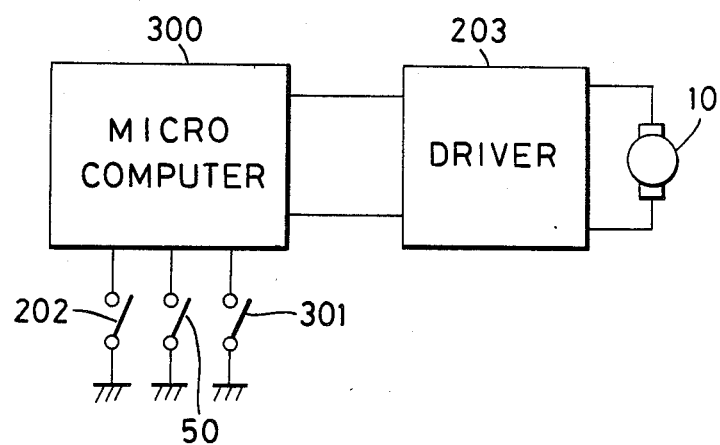
FIG. 10 is a circuit diagram of a modification of the motor control circuit.

FIG. 7 shows a motive force transmission system in another embodiment of the present invention. In the transmission system shown in FIG. 1, the sprocket 48 is coupled to the motor 10 and driven thereby, while in the transmission system of FIG. 7, a sprocket 480 is not coupled to the motor 10 but follows the film to be fed. The like elements to those shown in FIG. 1 are designated by the like numerals and the explanation thereof is omitted. FIG. 8 shows a control circuit for the motor 10 of the present embodiment, and FIG. 10 shows a switch for detecting the completion of rewinding.

Figure 5:
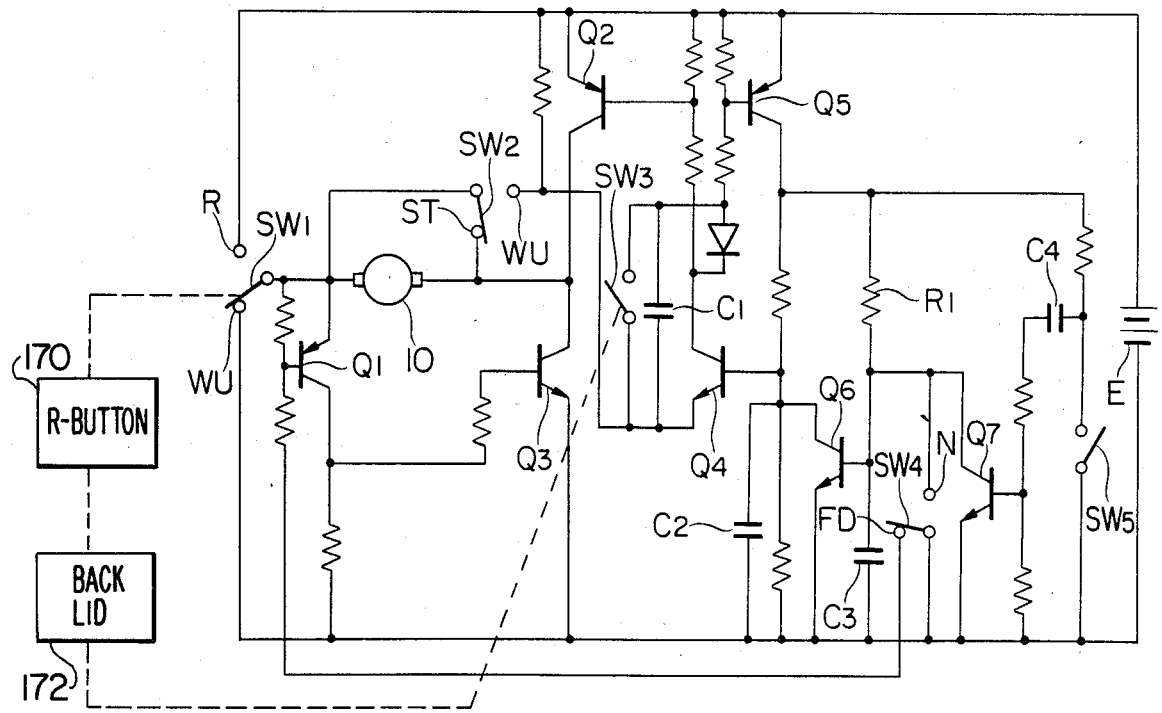
FIG. 5 is a circuit diagram showing an electrical control device applied to the above embodiment.
Figure 9:
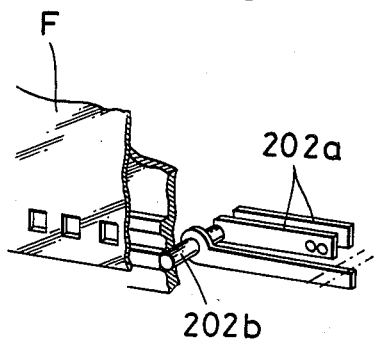
FIG. 9 is a perspective view of an end-of-rewinding detection switch used in the other embodiment.

In FIG. 8, when a rewind signal generation circuit 200 detects that the film has reached its end (the film in the film cartridge 60 has been taken up on the spool 44 and no further take-up is permitted) by the fact that the stop of the film under the energization of the motor 10 exceeded a predetermined period of time, the circuit 200 produces a High-level start of rewind signal, which may be the output of the CR timer comprising the capacitor C3 and the resistor R1 as shown in FIG. 5, or the potential across the capacitor C3. The start of rewind signal is supplied to one input terminal of an AND gate 201. A pull-up resistor R2 and a switch 202 are connected in series between a power line and ground, and the junction point of the resistor R2 and the switch 202 is connected to the other input terminal of the AND gate 201 through an inverter. The switch 202 is kept on while the film is wound on the take-up spool 44, and turned off at the end of rewinding of the film. FIG. 9 shows an embodiment of switch 202. In FIG. 9, the switch 202 comprises a pair of contact pieces 202a and a projection 202b which is biased to protrude into a feed path of the film. While the film F is wrapped on the spool 44, the film F prevents the projection 202b from protruding. As a result, the contact pieces 202a are pushed together by the projection 202b and make contact with each other. Accordingly, the switch 202 is turned on. At the end of rewinding of the film F, the film F does no longer interrupt the projection 202b, which now protrudes so that the contact pieces 202a separate and break the contact. Accordingly, the AND gate 201 gates the output of the rewind signal generation circuit 200 while the film is wrapped on the spool, and does not gate it after the end of rewinding. The output terminal of the AND gate 201 is connected to a motor drive circuit 203, which, when it receives the High-level start of rewind signal from the AND gate 201, reversely rotates the motor 10 to rewind the film taken up on the spool 44 into the cartridge 60.

A timer circuit 204 has an input terminal and an output terminal. The input terminal is connected to the junction point of the pull-up resistor $R_2$ and the switch 202. When the switch 202 is turned off and the potential at the input terminal assumes the High-level, the timer circuit 204 starts clocking. The output terminal of the timer circuit 201 is connected to one input terminal of an AND gate 205. When the timer circuit 204 starts clocking, it produces a High-level clock signal at an output terminal, and after a predetermined period of time, it reverses the potential of the output terminal to a Low-level and stops the output of the clock signal. So long as the switch 202 is off, the AND gate 205 gates the clock signal over a predetermined period of time. The output terminal of the AND gate 205 is connected to the motor drive circuit 203. When the motor drive circuit 203 receives the High-level clock signal from the AND gate 205, it forwardly rotates the motor 10. As a result, the sun gear 26 is rotated rightward to rotate the planet arm 30 rightward as was done in the embodiment of FIG. 1 so that the planet gear 34 is disengaged from the gear 38. As a result, the fork 66 is free to rotate and a film leader of a film in an unused film cartridge contained in the film chamber can be taken out. In order to disengage the planet gear 34 from the gear 38, that is, in order to disconnect the motor 10 from the rewind system, the motor 10 is rotated until one frame of film is taken up in the embodiment of FIG. 1. In the embodiment of FIGS. 7 and 8, the rotation of the motor is limited to a minimum amount necessary to disconnect the motor 10 from the rewind system by appropriately setting the clocking time of the timer circuit 204 so that the motor is stopped before the planet gear 34 meshes with the gear 36 of the take-up system.

The switch 50 in FIG. 7 which engages with the lower teeth of the sprocket 480 is repeatedly turned on and off as the sprocket 480 rotates. The switch 50 is an embodiment of the switch SW5 which resets the CR timer comprising the capacitor $C_3$ and the resistor $R_1$ shown in FIG. 5 as the film is fed.

FIG. 10 shows another control circuit which operates in the same manner as that of FIG. 8. The like elements to those shown in FIG. 8 are designated by the like numerals. A microcomputer 300 includes a CPU, a memory, I/O ports and a timer, and switches 202, 50 and 301 are connected to the input ports. The switch 301 is turned on when a photographing operation is finished, that is, when the shutter is closed. Two input terminals of a motor drive circuit 203 are connected to the output ports.

Figure 11:
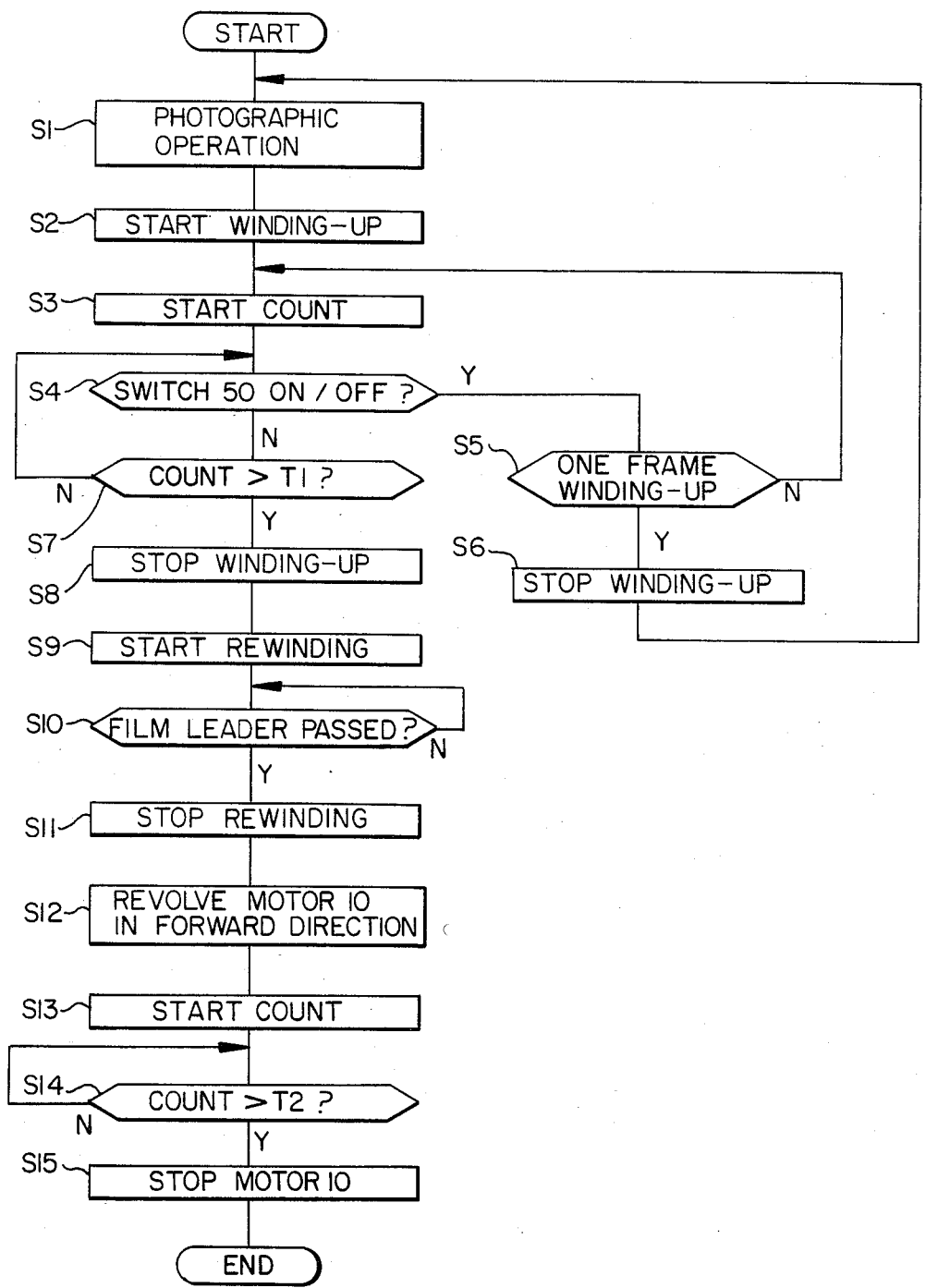
FIG. 11 is a flow chart showing an operation of the control circuit of FIG. 10.

FIG. 11 is a flow chart illustrating the operation of the control circuit of FIG. 10. The operation of the embodiment of FIG. 10 is now explained with reference to the flow chart of FIG. 11.

i. Wind-up Operation for Each Photographing Operation (steps S1–S6)

When the microcomputer detects the end of the photographing operation (step S1) by the closure of the switch 301, it sends a signal to the motor drive circuit 203 to forwardly rotate the motor 10 to start the wind-up of the film (step S2). Then, the microcomputer 300 starts counting by the timer (step S3). The microcomputer 300 determines if the status of the switch 50 has changed from the previously monitored status as the film is wound up, that is, if the switch 50 has been turned off from its on state of vice versa (step S4). If the decision in the step S4 is affirmative, the microcomputer 300 checks if one frame of film has been wound up (step S5). This may be done by checking if the number of times of change of the status of the switch 50 has reached a predetermined number. If the decision in the step S5 is negative, the process returns to the step S3 and the timer is reset. If the decision in the step S5 is affirmative, the microcomputer 300 sends a signal to the motor control circuit 203 to stop the forward rotation of the motor 10 to stop the wind-up of the film (step S6). Then, the process returns to the step S1 and waits for the photographing operation.

ii. Detection of End of Film and Following Wind-up Operation (steps S7–S11)

If the decision in the step S4 is negative, the microcomputer 300 checks if the timer has counted a time period T1 which is slightly longer than the time period required for feeding one perforation of film, that is, the time period required for the sprocket to make one tooth of rotation. If the decision in the step S7 is negative, the process returns to the step S4, and if the decision is affirmative, the microcomputer 300 determines that the end of the film has been reached and sends a signal to the motor control circuit 203 to stop the motor 10 and stop the wind-up of the film (step S8). Then, the microcomputer 300 sends a signal to the motor control circuit 203 to reversely rotate the motor 10 to start the rewinding of the film (step S9). The microcomputer 300 then checks if the switch 202 has been turned off, that is, as shown in FIG. 10, if the leader of the film has passed and no longer intersects the projection 202b and allows the protrusion of the projection 202b to release the contact between the contact pieces 202a (step S10). The microcomputer 300 repeats the above decision step until the affirmative decision is obtained in the step S10. When the affirmative decision is obtained, the microcomputer 300 determines that the rewinding has been completed and sends a signal to the motor control circuit 203 to stop feeding the motor 10 in order to stop the reverse rotation thereof and stop the rewinding of the film (step S11).

iii. Forward Rotation of Motor to Disconnect Motor from Rewinding System (steps S12–S15)

The microcomputer 300 then sends a signal to forwardly rotate the motor 10 to the motor control circuit 203 (step S12) and then starts counting by the timer (step S13). The microcomputer 300 checks if the timer has counted a time period T2 (step S14) and repeats the above decision step until the affirmative decision is obtained. The time period T2 is set to a time period necessary for the sun gear 26 to rotate rightward to rotate the planet arm 30 rightward to disengage the planet gear 34 from the gear 38 and disconnect the motor 10 from the rewinding system. If the affirmative decision is obtained in the step S14, the microcomputer 300 determines that the motor 10 has been disconnected from the rewinding system and sends a signal to the motor control circuit 203 to stop feeding electric current to the motor 10 and stop the forward rotation thereof (step S15).

Figure 12:
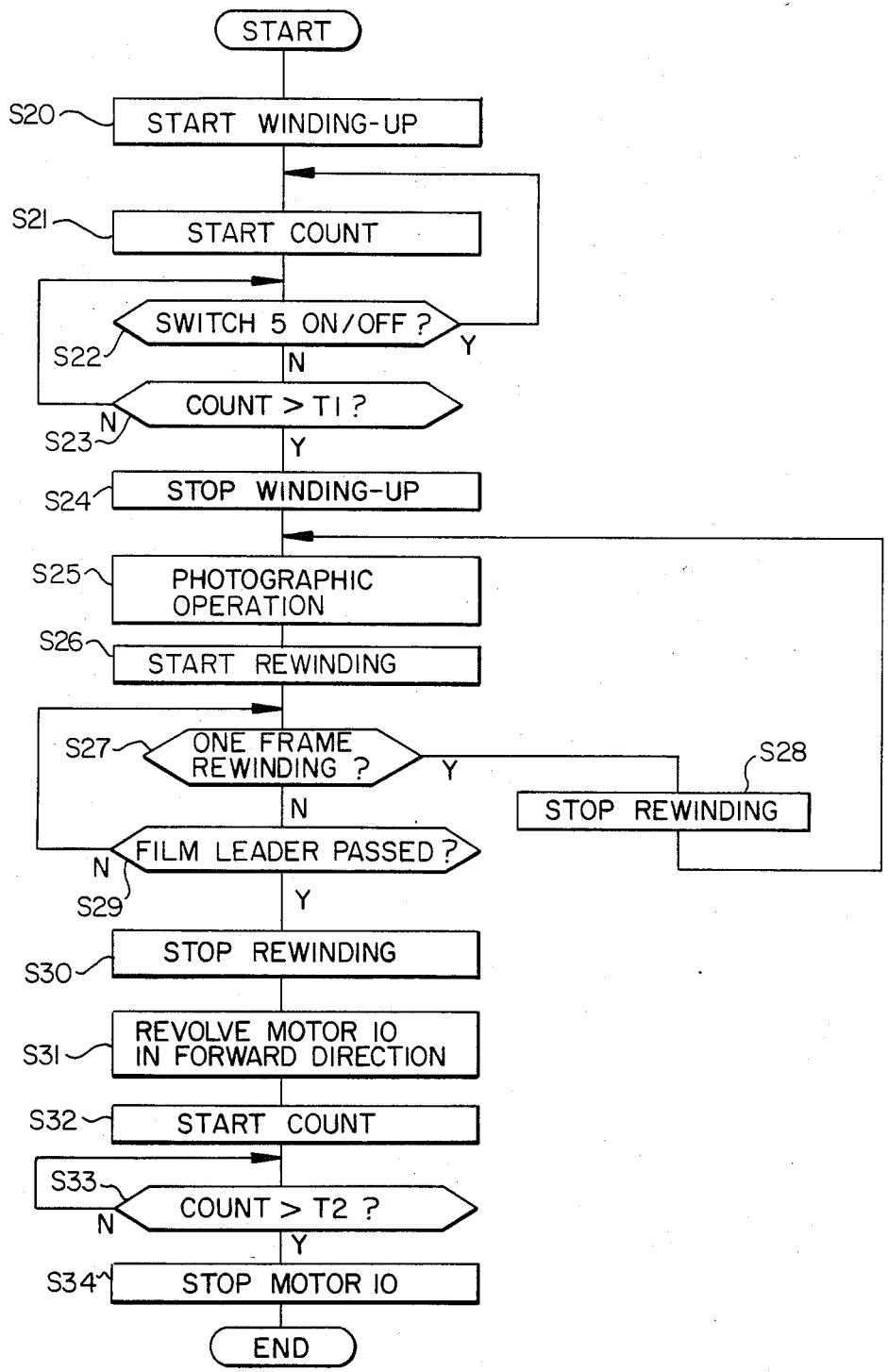
FIG. 12 is a flow chart showing another operation of the control circuit of FIG. 10.

In the present embodiment, a conventional wind-up type camera is shown. The present invention is also applicable to a pre-wind-up type camera in which, when an unused cartridge is loaded in the camera, all unused films in the cartridge are wound up on the take-up spool, and rewound into the cartridge frame by frame for each photographing operation. A mechanism of the camera of this type may be similar to that shown in FIG. 7 although the control sequence of the motor 10 by the microcomputer 300 is different. An embodiment therefor is explained with reference to a flow chart shown in FIG. 12.

i. Pre-wind-up Operation (steps S20–S24)

When the microcomputer 300 detects that the rear lid has been closed by detecting the change of status of a switch (not shown), it sends a signal to the motor control circuit 203 to forwardly rotate the motor 10 to start the wind-up of the film (step S20). Then, the microcomputer 300 starts counting by the timer (step S21). The microcomputer 300 checks if the status of the switch 50 has been changed from the previously monitored status as the film is wound up, that is, if the switch 50 has been turned off from the on state or vice versa (step S22). If the decision in the step S22 is affirmative, the process returns to the step S21 to reset the timer. If the decision in the step S22 is negative, the microcomputer 300 checks if the counter has counted the time period T1 (step S23). If the decision in the step S7 is negative, the process returns to the step S22, and if the decision is affirmative, the microcomputer 300 determines that the end of the film has been reached and sends a signal to the motor control circuit 203 to stop feeding electric current to the motor 10 and stop the wind-up of the film (step S24).

ii. Rewind Operation for Each Photographing Opertion (steps S25–S28)

The photographing operation is monitored (step S25). When the microcomputer 300 detects that the photographing operation has been completed by detecting the closure of the switch 301, the microcomputer 300 sends a signal to the motor control circuit 203 to reversely rotate the motor 10 to start rewinding of the film (step S26). The microcomputer 300 checks if one frame of film has been rewound (step S27). This may be done by checking if the number of times of change of the status of the switch 50 has reached a predetermined number. If the decision is affirmative, the microcomputer 300 sends a signal to the motor control circuit 203 to stop the motor 10 and stop the rewinding of the film (step S28). If the decision in the step S27 is negative, the microcomputer 300 checks if the switch 202 has been turned off by detecting passage of the film leader (step S29). If the decision in the step S29 is negative, the process returns to the step S27, and if the decision is affirmative, the microcomputer sends a signal to the motor control circuit 203 to stop the motor 10 and stop the rewinding of the film (step S30).

iii. Forward Rotation of Motor for Disconnecting Motor from Rewinding System (steps S31–S34)

These steps the same as the steps S12–S15 of FIG. 11 and explanation thereof is therefore omitted.

In the embodiment shown in FIGS. 8 to 12, the forward rotation of the motor to disconnect the motor from the rewinding system is automatically started at the completion of the rewinding, although the present invention is not limited thereto. In the present invention, the forward rotation of the motor may be started in response to the detection of any one of the operations which necessarily take place during a period from the rewinding of the film wound up from the cartridge and used for photographing into the cartridge by the rewinding system to the loading of a new cartridge containing an unused film into the camera. For example, the following decision steps (1)–(4) may be inserted between the steps S11 and S12 of FIG. 11 or between the steps S30 and S31 of FIG. 12, and the decision steps may be repeated until the affirmative decision is obtained, whenupon the next step S12 or S31 is carried out.

Figure 13:
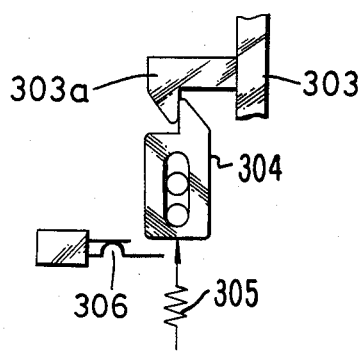
FIG. 13 shows a latch device for a rear lid and a switch linked thereto.

(1) Whether a latch device for latching a rear lid 303 of the camera, as shown in FIG. 13, has been released may be checked. A hook 303a is fixed to a free end of the rear lid 303, and an engaging member 304 which engages with the hook 303a is vertically movably mounted on the camera body. A spring 305 biases the engaging member upward to engage it with the hook 303a. In order to open (displace rightward in FIG. 13) the rear lid 303, an operator displaces the engaging member 304 downwardly against the biasing force of the spring 305 to disengage the hook 303a from the engaging member 304. Thus, a switch 306 is turned off from its on status. By detecting the signal generated when the switch 306 is turned off, the microcomputer 300 determines that the latch has been released and the process goes to the step S12 or S31.

Figure 14:
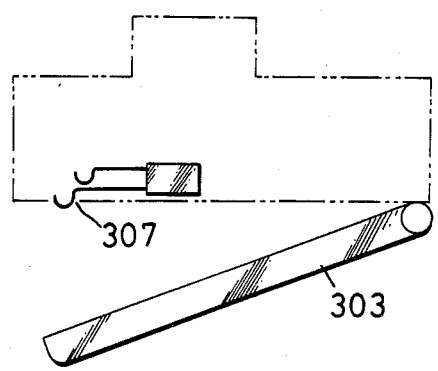
FIG. 14 shows the rear lid and a switch linked thereto.

(2) Whether the closed rear lid 303 of the camera shown in FIG. 14 has been opened may be checked. A switch 307 which is activated or deactivated by closing or opening the rear lid 303 is mounted on the camera body. The switch 307 is on when the rear lid 303 is closed, and off when it is open. By detecting the change of the status of the switch 307 from on to off, the opening of the rear lid is detected. Then, the process goes to the step S12 or S31.

Figure 15:
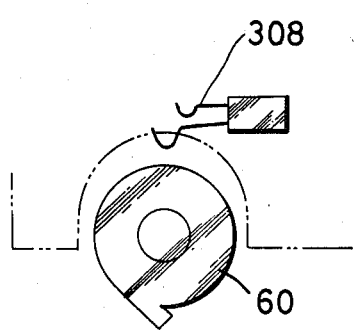
FIG. 15 shows a cartridge and a switch operated by loading and unloading thereof.

(3) Whether a used cartridge 60 contained in the film chamber of the camera has been taken out may be checked as shown in FIG. 15. In FIG. 15, a switch 308 which is on when the film is in the chamber and off when the film is not in the chamber is mounted on the camera body. By detecting the change of the status of the switch 308 from on to off, the removal of the cartridge from the chamber is detected. Then, the process goes to the step S12 or S31.

(4) Conversely to (3), whether an unused cartridge 60 has been loaded to the chamber of the camera may be checked. By detecting the change of the status of the switch 308 from off to on, the loading of the new cartridge to the chamber is detected. Then, the process goes to the step S12 or S31.

Figure 16:
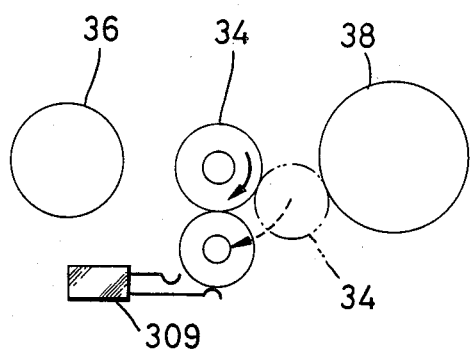
Figure 17:
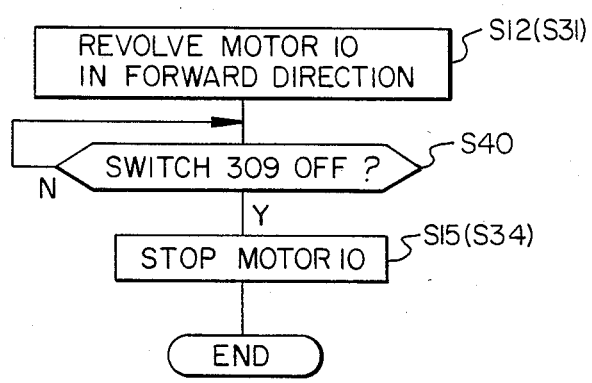
FIG. 17 is a flow chart showing the operation of the control circuit of FIG. 10 when the switch of FIG. 16 is used.

FIGS. 16 and 17 show a further embodiment of the present invention. In FIG. 16, a switch 309 is arranged in a displacement path of the planet gear 34. When the planet gear 34 is disengaged from the gear 38 to disconnect the motor from the rewinding system, the movable contact piece of switch 309 is press by the periphery of the displaced planet gear 34 so that the switch 309 is turned off. The switch 309 is connected to the input port of the microcomputer 300 of FIG. 10.

The program of the microcomputer 300 is partially modified for this embodiment. Most portions of the operation follow the flow chart of FIG. 11 (FIG. 12) and only the differences are shown in FIG. 17. The steps S13 and S14 (steps S32 and S33) of FIG. 11 (FIG. 12) are replaced by a step S40 in the flow chart of FIG. 17.

The operation of the present embodiment is explained. The microcomputer 300 starts the forward rotation of the motor 10 in the step S12 (S31) and then, in the step S40, checks if the switch 309 has been changed from the on status to the off status. If the decision is negative, the microcomputer 300 repeats the above step, and if the decision is affirmative, that is, if the switch 309 has been turned off, the process proceeds to the next step S15 (step S34) to stop the forward rotation of the motor 10. In accordance with the present embodiment, the disconnection of the motor 10 from the rewinding system is directly detected so that the operation is more accurate.

In the above embodiments, contact switches are used as the detection means of the operations, although the present invention is not limited thereto. For example, contactless switches (such as photoelectric switches) may be used instead of the contact switches.

We claim:

1. A film feeding device in a camera comprising:
(a) drive means having an electric motor;
(b) winding-up means driven to wind up an unexposed film;
(c) rewinding means driven to rewind an exposed film;
(d) a member responsive to an operation necessarily taking place during a period from the rewinding of said exposed film by said rewinding means to the loading of another unexposed film in said camera;
(e) change-over means which has a winding-up position where said drive means is coupled to the winding-up means and a rewinding position where said drive means is coupled to said rewinding means, the change-over means changing over from said rewinding position to said winding-up position in response to rotation of said electric motor in a first direction and the change-over means changing over from said winding-up position to said rewinding position in response to rotation of said electric motor in a second direction; and
(f) control means which is provided with switch means operated by said member and which causes said electric motor to be rotated in the first direction by at least an amount required for said change-over means to change over from said rewinding position to said winding-up position.

2. A film feeding device according to claim 1, wherein said member includes a lid member which is opened to load film into the camera.

3. A film feeding device according to claim 1, wherein said control means includes a timer circuit for rotating said electric motor by a given amount in response to said switch means.

4. A film feeding device according to claim 1, wherein said change-over means includes a planetary gear train having a central gear coupled to said drive means and a planet gear displaceable by said central gear between a position in which it is coupled to said winding-up means and a position in which it is coupled to said rewinding means.

5. A film feeding device according to claim 4, wherein said planet gear is displaced to said winding-up position in response to rotation of said electric motor in said first direction and displaced to said rewinding position in response to rotation of said electric motor in said second direction.

6. A film feeding device in a camera having a film chamber, comprising:

(a) drive means having an electric motor;
(b) winding-up means driven to wind up an unexposed film;
(c) rewinding means driven to rewind an exposed film;
(d) manual means which has a lid member closing said film chamber and which is operated by an operator to open said lid member;
(e) change-over means which has a winding-up position where said drive means is coupled to the winding-up means and a rewinding position where said drive means is coupled to said rewinding means, the change-over means changing over from said rewinding position to said winding-up position in response to the rotation of said electric motor in a first direction and the change-over means changing over from said winding-up position to said rewinding position in response to rotation of said electric motor in a second direction; and
(f) control circuit means which is provided with switch means operatively associated with said manual means and which causes said electric motor to be rotated in the first direction by at least an amount required for said change-over means changing over from said rewinding position to said winding-up position.

7. A film feed device of a camera comprising:
(a) a motor;
(b) a wind-up system for winding up a film from a cartridge by a force of said motor to present the film for photographing;
(c) a rewind system for rewinding the film wound up and presented for photographing into the cartridge by the force of said motor;
(d) switching-over means displaceable between a first position to couple said motor to said wind-up system and a second position to couple said motor to said rewind system, said switching-over means being displaced to said first position when said motor is rotated in one direction and displaced to said second position when said motor is rotated in the other direction;
(e) start signal generation means for detecting an operation necessarily taking place during a time period from the rewinding of the film wound up from said cartridge and presented for photographing into said cartridge by said rewind system to the loading of a new cartridge containing an unused film into said camera, to generate a start signal;
(f) a control circuit responsive to said start signal for rotating said motor in said one direction; and
(g) a timer circuit responsive to said start signal for starting clocking and sending a clock signal to said control circuit after a predetermined time period to stop the rotation of said motor in said one direction;
the rotation of said motor in said one direction causing the displacement of said switching-over means from said second position to disconnect said motor from said rewind system.

8. A film feed device of a camera according to claim 7, wherein said start signal generation means generates said start signal when it detects that the photographed film has been rewound into said cartridge by said rewind system.

9. A film feed device of a camera according to claim 7, wherein said start signal generation means generates said start signal when it detects the release of a latch of a rear lid of the camera on opening of the rear lid after the photographed film has been rewound into said cartridge.

10. A film feed device of a camera according to claim 7, wherein said start signal generation means generates said start signal when it detects that a rear lid of the camera has been opened after the photographed film has been rewound into said cartridge.

11. A film feed device of a camera according to claim 7, wherein said start signal generation means generates said start signal when it detects that said cartridge having the photographed film rewound therein has been taken out of the camera.

12. A film feed device of a camera according to claim 7, wherein said start signal generation means generates said start signal when it detects that said new cartridge has been loaded to said camera.

13. A film feed device of a camera comprising:
(a) a motor;
(b) a wind-up system for winding up a film from a cartridge by a force of said motor to present the film for photographing;
(c) a rewind system for rewinding the film wound up and presented for photographing into the cartridge by the force of said motor; .
(d) switching-over means displaceable between a first position to couple said motor to said wind-up system and a second position to couple said motor to said rewind system, said switching-over means being displaced to said first position when said motor is rotated in one direction and displaced to said second position when said motor is rotated in the other direction;
(e) start signal generation means for detecting an operation necessarily taking place during a time period from the rewinding of the film wound up from said cartridge and presented for photographing into said cartridge by said rewind system to the loading of a new cartridge containing an unused film into said camera to generate a start signal;
(f) a control circuit responsive to said start signal for rotating said motor in said one direction; and
(g) detection means arranged in a displacement path of said switching-over means for sending a detection signal to said control circuit upon detection of the displacement of said switching-over means from said second position;
said control circuit being responsive to said detection signal for stopping the rotation of said motor in said one direction;
the rotation of said motor in said one direction causing the displacement of said switching-over means from said second position to disconnect said motor from said rewind system.

14. A film feed device of a camera according to claim 13, wherein said start signal generation means generates said start signal when it detects that the photographed film has been rewound into said cartridge by said rewind system.

15. A film feed device of a camera according to claim 13, wherein said start signal generation means generates said start signal when it detects the release of a latch of a rear lid of the camera on opening of the rear lid after the photographed film has been rewound into said cartridge.

16. A film feed device of a camera according to claim 13, wherein said start signal generation means generates said start signal when it detects that a rear lid of the camera has been opened after the photographed film has been rewound into said cartridge.

17. A film feed device of a camera according to claim 13, wherein said start signal generation means generates said start signal when it detects that said cartridge having the photographed film rewound therein has been taken out of the camera.

18. A film feed device of a camera according to claim 13, wherein said start signal generation means generates said start signal when it detects that said new cartridge has been loaded to said camera.

19. A film feeding device in a camera comprising:
(a) drive means having an electric motor;
(b) winding-up means driven to wind up an unexposed film;
(c) rewinding means driven to rewind an exposed film;
(d) means for generating a detection signal in response to an operation which takes place during a period from rewinding of said exposed film by said rewinding means to the loading of another unexposed film in said camera;
(e) change-over means which has a winding-up position where said drive means is coupled to the winding-up means and a rewinding position where said drive means is coupled to said rewinding means, the change-over means changing over from said rewinding position to said winding-up position in response to rotation of said electric motor in a first direction and the change-over means changing over from said winding-up position to said rewinding position in response to rotation of said electric motor in a second direction; and
(f) control means which is responsive to said detection signal and which causes said electric motor to be rotated in the first direction by an amount sufficient for said change-over means at least partially to change over from said rewinding position to uncouple said drive means from said rewinding means.

20. A film feeding device according to claim 19, wherein said control means includes means for stopping the rotation of said electric motor in said first direction after a predetermined time period from the time when said detection signal is generated.

21. A film feeding device according to claim 20, wherein said stopping means includes timer means responsive to said detection signal.

* * * * *